US009089776B2

(12) United States Patent
Yamaoka et al.

(10) Patent No.: US 9,089,776 B2
(45) Date of Patent: Jul. 28, 2015

(54) GAME DEVICE WHICH RECOGNIZES AND REPLACES A SUBSTITUTION OBJECT PARTICIPATING IN A COMPETITION GAME IN A VIRTUAL SPACE

(75) Inventors: Masatoshi Yamaoka, Tokyo (JP); Hironobu Mori, Tokyo (JP); Shuichi Myogan, Tokyo (JP); Yuichi Hiruta, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 141 days.

(21) Appl. No.: 13/883,649

(22) PCT Filed: Nov. 28, 2011

(86) PCT No.: PCT/JP2011/006601
§ 371 (c)(1),
(2), (4) Date: May 6, 2013

(87) PCT Pub. No.: WO2012/077291
PCT Pub. Date: Jun. 14, 2012

(65) Prior Publication Data
US 2013/0225292 A1 Aug. 29, 2013

(30) Foreign Application Priority Data
Dec. 10, 2010 (JP) ................................ 2010-275824

(51) Int. Cl.
*A63F 13/12* (2006.01)
*A63F 13/2145* (2014.01)
(Continued)

(52) U.S. Cl.
CPC ........... *A63F 13/2145* (2014.09); *A63F 13/428* (2014.09); *A63F 13/45* (2014.09);
(Continued)

(58) Field of Classification Search
CPC ............ A63F 13/06; A63F 2300/1075; A63F 2300/204; A63F 2300/8011; A63F 13/00; A63F 13/10; A63F 2300/6045; A63F 2300/306; A63F 2300/307; G06F 3/0484
USPC .............................................. 463/1–3, 36–37
See application file for complete search history.

(56) References Cited

U.S. PATENT DOCUMENTS

| | | | |
|---|---|---|---|
| 2010/0056281 A1* | 3/2010 | Uchiyama | 463/42 |
| 2010/0121469 A1* | 5/2010 | Keller et al. | 700/92 |
| 2011/0157029 A1* | 6/2011 | Tseng | 345/173 |

FOREIGN PATENT DOCUMENTS

| | | |
|---|---|---|
| JP | 2002-282545 | 10/2002 |
| JP | 2006-129942 | 5/2006 |

(Continued)

OTHER PUBLICATIONS

"SCF", "Pokemon Crystal: Red Battle", Uploaded on May 6, 2008, Youtube.com, <https://www.youtube.com/watch?v=p9B5lyC0yfl>.
*

(Continued)

*Primary Examiner* — Justin Myhr
(74) *Attorney, Agent, or Firm* — Wenderoth, Lind & Ponack, L.L.P.

(57) ABSTRACT

A game device including: a substituted-for character recognizing unit which recognizes a character to become a substitution object by bringing a finger 107 into contact with the character; a substituted-for character determination unit which determines the recognized character to be a substituted-for character by causing the recognized character to be moved to a substituted-for character determination region (an edge of a monitor 3a); and a candidate character list display unit which displays a candidate character list 109 on an image display unit based on the determination of the substituted-for character, wherein after determining a character who enters the game by bringing the finger 107 into contact with a character on the candidate list, the entering character is displayed on the image display unit in place of the substituted-for character.

9 Claims, 10 Drawing Sheets

(51) Int. Cl.
*A63F 13/45* (2014.01)
*A63F 13/525* (2014.01)
*A63F 13/5372* (2014.01)
*A63F 13/533* (2014.01)
*A63F 13/428* (2014.01)
*G06F 3/0486* (2013.01)
*G06F 3/0484* (2013.01)
*A63F 13/812* (2014.01)
*A63F 13/55* (2014.01)
*A63F 13/20* (2014.01)
*A63F 13/40* (2014.01)
*A63F 13/00* (2014.01)

(52) U.S. Cl.
CPC ............ *A63F 13/525* (2014.09); *A63F 13/533* (2014.09); *A63F 13/5372* (2014.09); *G06F 3/0484* (2013.01); *G06F 3/0486* (2013.01); *A63F 13/00* (2013.01); *A63F 13/06* (2013.01); *A63F 13/10* (2013.01); *A63F 13/55* (2014.09); *A63F 13/812* (2014.09); *A63F 2300/1075* (2013.01); *A63F 2300/204* (2013.01); *A63F 2300/6045* (2013.01)

(56) References Cited

FOREIGN PATENT DOCUMENTS

| | | |
|---|---|---|
| JP | 2009-28217 | 2/2009 |
| JP | 4258850 | 4/2009 |
| KR | 10-2006-0054221 | 5/2006 |

OTHER PUBLICATIONS

Office Action issued May 9, 2014 in corresponding Korean Application No. 10-2013-7003749, with English Summary.

International Search Report issued Jan. 17, 2012 in International (PCT) Application No. PCT/JP2011/006601.

\* cited by examiner

GAME DEVICE WHICH RECOGNIZES AND REPLACES A SUBSTITUTION OBJECT PARTICIPATING IN A COMPETITION GAME IN A VIRTUAL SPACE

TECHNICAL FIELD

The present invention relates to a technique for controlling progress of a competition game in a virtual space by bringing indicating means into contact with a contact input-type image display unit and, in particular, to an operation for substituting a character participating in the competition game with another character.

BACKGROUND ART

Some known conventional baseball games have specifications that allow substitutions of player characters participating in a game. With a baseball game according to Japanese Patent Application Laid-open No. 2009-28217, in a case where a game player wishes to substitute a player character such as by using a pinch hitter for a next batter, the game player first presses a "time-out" button on a screen showing a game in progress. As a result, a transition is made from the game-in-progress screen to a bird's-eye view screen showing only enlarged close-ups of a plurality of players that are substitution objects (see FIG. 7 and FIG. 8 in Japanese Patent Application Laid-open No. 2009-28217. The game player then selects and decides a player character (in this case, a batter) that the game player wishes to use as a substitute from the players shown in the bird's-eye view screen. Subsequently, by returning to the game screen, the game can be restarted from a state where the substitution with the pinch hitter has been made.

However, with the player substitution method disclosed in Japanese Patent Application Laid-open No. 2009-28217 described above, displaying substitution candidate players requires a screen transition step in which the game-in-progress screen is first switched to another screen, a player is then selected and decided, and the original screen is subsequently restored. Therefore, there are problems in that in addition to a substitution requiring a time-consuming operation, a substitution causes a game-in-progress screen to be temporarily switched to a completely different screen and gives an impression that a flow of the game has been abruptly disrupted.

SUMMARY OF THE INVENTION

In consideration thereof, an object of the present invention is to provide a contact-input type game device and a game control program which simplify an operation for a substitution and prevents a flow of a game from being abruptly disrupted by adopting a configuration that enables characters to be substituted in a game screen without having to go through a complicated screen transition.

A game device according to an aspect of the present invention is a game device which conducts a competition game in a virtual space by bringing indicating means into contact with a contact input-type image display unit, the game device comprising: a substituted-for character recognizing unit which recognizes a character to become a substitution object by bringing the indicating means into contact with a single character participating in the competition game; a substituted-for character determination unit which determined the character to be a substituted-for character by causing the character recognized by the substituted-for character recognizing unit to be moved to a substituted-for character determination region while maintaining the contact between the indicating means and the character; a candidate character list display unit which displays a list of candidate characters who enter the game in place of the substituted-for character on the image display unit based on the determination of the substituted-for character by the substituted-for character determination unit; an entering character determination unit which determined a character who enters the game in place of the substituted-for character by bringing the indicating means into contact with a single character on the candidate list; and a character substitution display unit which displays on the image display unit the entering character determined by the entering character determination unit in place of the substituted-for character.

In addition, a game control program according to another aspect of the present invention is a game control program which causes a computer to execute a competition game in a virtual space by bringing indicating means into contact with a contact input-type image display unit, the game control program causing the computer to function as: a substituted-for character recognizing unit which recognizes a character to become a substitution object by bringing the indicating means into contact with a single character participating in the competition game; a substituted-for character determination unit which determined the character to be a substituted-for character by causing the character recognized by the substituted-for character recognizing unit to be moved to a substituted-for character determination region while maintaining the contact between the indicating means and the character; a candidate character list display unit which displays a list of candidate characters who enter the game in place of the substituted-for character on the image display unit based on the determination of the substituted-for character by the substituted-for character determination unit; an entering character determination unit which determined a character who enters the game in place of the substituted-for character by bringing the indicating means into contact with a single character on the candidate list; and a character substitution display unit which displays the entering character determined by the entering character determination unit in place of the substituted-for character on the image display unit.

A game device according to yet another aspect of the present invention is a game device which conducts a competition game in a virtual space by bringing indicating means into contact with a contact input-type image display unit, the game device comprising: a substituted-for character recognizing unit which recognizes a character to become a substitution object by bringing the indicating means into contact with a single character participating in the competition game; a substituted-for character determination unit which determines the character to be a substituted-for character by causing the character recognized by the substituted-for character recognizing unit to be moved toward an outer frame section of a game screen displayed on the image display unit at a predetermined or higher speed from a state where the indicating means is in contact with the character; a candidate character list display unit which displays a list of candidate characters who enter the game in place of the substituted-for character on the image display unit based on the determination of the substituted-for character by the substituted-for character determination unit; an entering character determination unit which determines a character who enters the game in place of the substituted-for character by bringing the indicating means into contact with a single character on the candidate list; and a character substitution display unit which displays the entering character determined by the entering character determination unit in place of the substituted-for character on the image display unit.

A game control program according to still another aspect of the present invention is a game control program which causes a computer to execute a competition game in a virtual space by bringing indicating means into contact with a contact input-type image display unit, the game control program causing the computer to function as: a substituted-for character recognizing unit which recognizes a character to become a substitution object by bringing the indicating means into contact with a single character participating in the competition game; a substituted-for character determination unit which determines the character to be a substituted-for character by causing the character recognized by the substituted-for character recognizing unit to be moved toward an outer frame section of a game screen displayed on the image display unit at a predetermined or higher speed from a state where the indicating means is in contact with the character; a candidate character list display unit which displays a list of candidate characters who enter the game in place of the substituted-for character on the image display unit based on the determination of the substituted-for character by the substituted-for character determination unit; an entering character determination unit which determines a character who enters the game in place of the substituted-for character by bringing the indicating means into contact with a single character on the candidate list; and a character substitution display unit which displays the entering character determined by the entering character determination unit in place of the substituted-for character on the image display unit.

DESCRIPTION OF EMBODIMENTS

[Configuration of Game Device]

Figure 1:
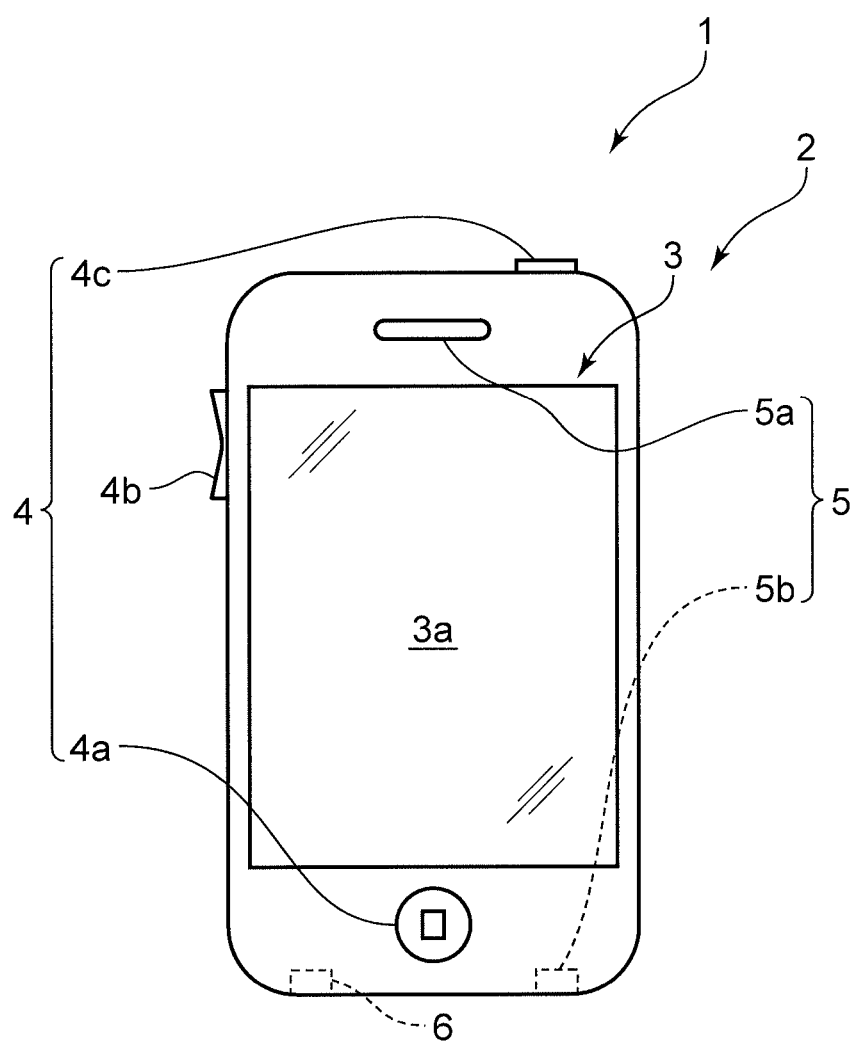
FIG. 1 is a diagram showing a portable game console according to an embodiment of the present invention.
Figure 2:
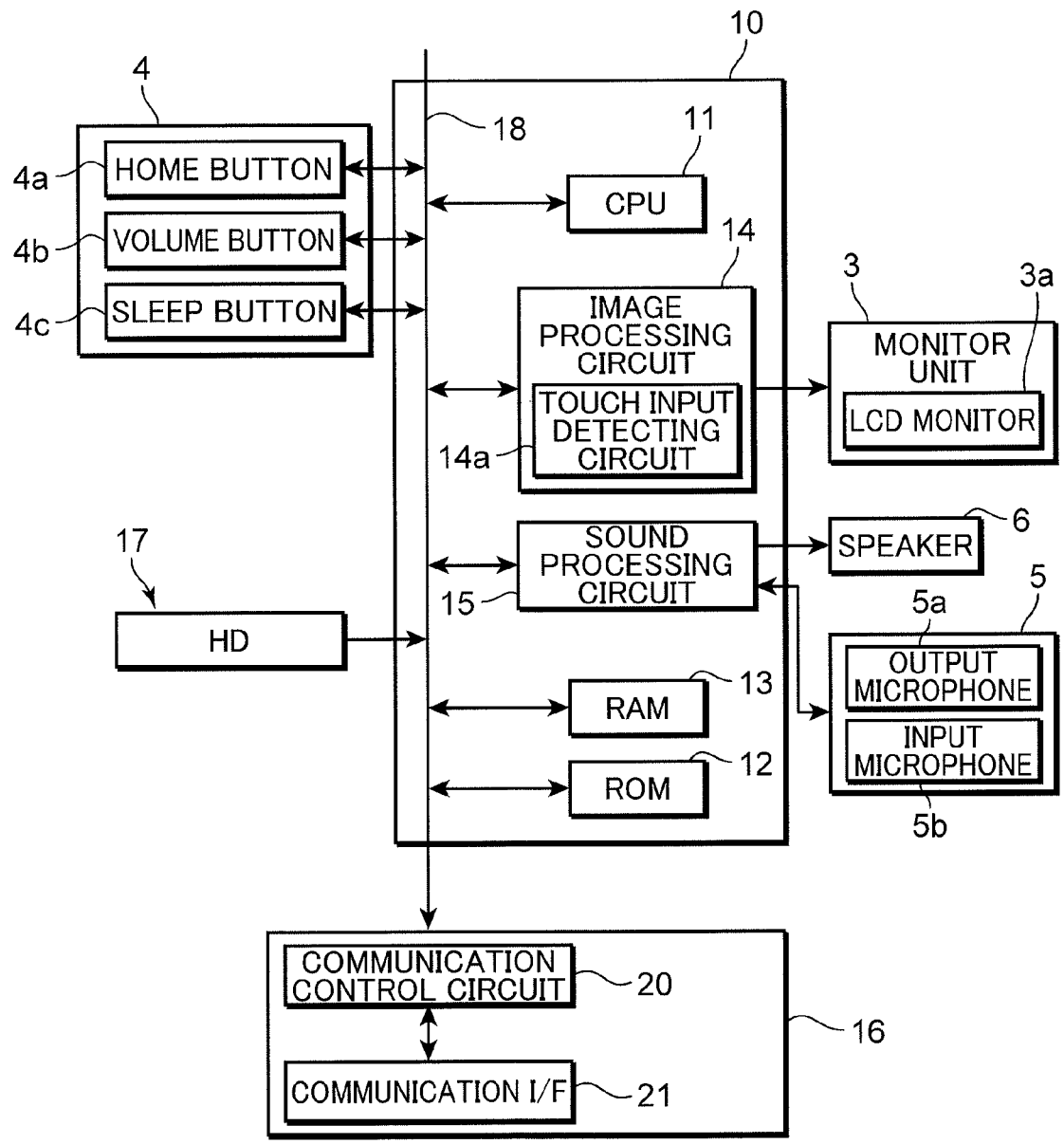
FIG. 2 is a diagram showing a hardware configuration of the portable game console according to an embodiment of the present invention.

FIG. 1 is an external view of a portable game console 1 as an example of a computer to which a game control program according to the present invention may be applied. In addition, FIG. 2 is a control block diagram as an example of the portable game console 1.

As shown in FIG. 1, the portable game console 1 mainly comprises a main body 2, a monitor unit 3, a basic operating unit 4, a microphone 5, and a speaker 6. The monitor unit 3 is provided on the main body 2 and includes a liquid crystal display (LCD) monitor 3a. In this case, for example, the LCD monitor 3a is an electrostatic contact input-type monitor or, in other words, a touch screen monitor. With this LCD monitor 3a, an electric field is formed on an entire surface of the touch screen. When indicating means such as a finger or a conductive pen is brought into contact with the surface of the touch screen in this state, a surface electric charge on the liquid crystal surface changes. The change in the surface electric charge is acquired and a position of the finger, the pen, or the like on the touch screen is detected. In this case, a projection touch screen is used which enables simultaneous detection of multiple points.

The basic operating unit 4 has a home button 4a, a volume button 4b, and a sleep button 4c. The home button 4a is provided at a lower part of the touch screen of the main body 2. When the home button 4a is pressed, a home screen is displayed or the portable game console 1 awakes from a sleep state. The volume button 4b is provided at an upper part on a side face of the main body 2. When an upper part of the volume button 4b is pressed, volume increases, and when a lower part of the volume button 4b is pressed, volume decreases. The sleep button 4c is provided on an upper face of the main body 2. When the sleep button 4c is pressed, the portable game console 1 enters a sleep state.

The microphone 5 has an output microphone 5a for audio output and an input microphone 5b for audio input. The output microphone 5a is provided at an upper part of the touch screen of the main body 2. Audio is outputted from the output microphone 5a when executing a game, engaging in telephone communication, listening to music, and the like. The input microphone 5b is built into the main body 2 and an output port is provided on a lower face of the main body 2. Audio is inputted from the input microphone 5b when engaging in telephone communication, performing recording, and the like.

The speaker 6 is built into the main body 2 and an output port is provided on the lower face of the main body 2. Audio is outputted from the speaker 6 when executing a game, listening to music, listening to a recording, and the like. Moreover, while the portable game console 1 is also provided with an earphone jack and the like, a description thereof will be omitted.

In addition, as shown in FIG. 2, the portable game console 1 mainly internally includes a control unit or, in other words, a control device 10, a communication unit 16, and a storage device 17. The control device 10 includes a CPU (Central Processing Unit) 11 that utilizes a microprocessor, a ROM (Read Only Memory) 12 as a main storage device, a RAM (Random Access Memory) 13, an image processing circuit 14, and a sound processing circuit 15. These components are connected to one another via a bus 18.

The CPU 11 interprets instructions from the game control program and performs various types of data processing and control. The ROM 12 stores programs and the like necessary for basic control (for example, activation control) of the portable game console 1. The RAM 13 secures a work area for the CPU 11. The image processing circuit 14 controls the monitor unit 3 according to a drawing instruction from the CPU 11 and displays a predetermined image on the LCD monitor 3a. In addition, the image processing circuit 14 includes a touch input detecting circuit 14a. When indicating means such as a finger is brought into contact with the touch screen, a contact signal is supplied from the touch input detecting circuit 14a to the CPU 11 and a contact position is recognized by the CPU 11. Furthermore, when the indicating means is brought into contact with the touch screen at a position of an object displayed on the LCD panel, a selection signal of the object is supplied from the touch input detecting circuit 14a to the CPU 11 and the object is recognized by the CPU.

The sound processing circuit 15 generates an analog audio signal in accordance with an instruction to produce audio from the CPU 11 and outputs the analog audio signal to the output microphone 5a and/or the speaker 6. In addition, when a sound is inputted from the input microphone 5b, an analog audio signal is converted into a digital audio signal.

The communication unit 16 has a communication function that enables data communication to be performed when a game is being executed, a communication function that enables communication as a mobile phone, and the like. The communication function for data communication includes a local wireless network function, a function that enables Internet connection via a wireless LAN, and the like.

The communication unit 16 includes a communication control circuit 20 and a communication interface 21. The communication control circuit 20 and the communication interface 21 are connected to the CPU 11 via the bus 18. In response to an instruction from the CPU 11, the communication control circuit 20 and the communication interface 21 control and transmit a connection signal for connecting the portable game console 1 to the Internet via a local wireless network or a wireless LAN. In addition, when performing a telephone communication, in response to an instruction from the CPU 11, the communication control circuit 20 and the communication interface 21 control and transmit a connection signal for connecting the portable game console 1 to a telephone line.

The storage device 17 is built into the main body 2 and connected to the bus 18. For example, a hard disk, a flash memory drive, or the like as a storage medium is used as the storage device 17. Moreover, while an interface circuit is interposed as necessary between the bus 18 and each component, such interface circuits have been omitted from the drawings.

With the portable game console 1 configured as described above, as the game control program stored in the storage device 17 is loaded and the CPU 11 executes the loaded game control program, a game player can play games of various categories on the monitor unit 3. In addition, by connecting the portable game console 1 to a wireless network via the communication control circuit 20 or connecting the portable game console 1 to another game console via a communication cable or the like, data can be exchanged or a competition game can be played with the other game console.

Games that are executed with the present game system include a baseball game. A game control program for executing a baseball game is stored in a storage device (not shown), and when executing the baseball game, the game control program is loaded to the RAM 13 to be executed. In a baseball game executed in this manner, various instructions are issued by bringing indicating means such as a finger into contact with the touch screen-type LCD monitor 3a (hereinafter, referred to as the monitor 3a).

[Description of Character Substitution Operation in a Baseball Game to which the Present Invention is Applied]

Figure 3A:
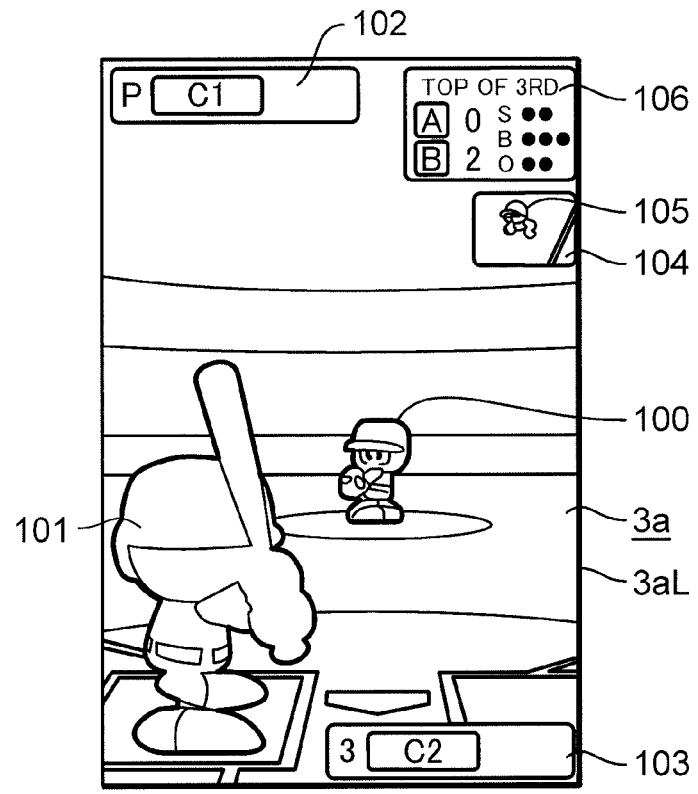
FIGS. 3A and 3B are diagrams showing a flow of a game screen according to an embodiment of the present invention.
Figure 3B:
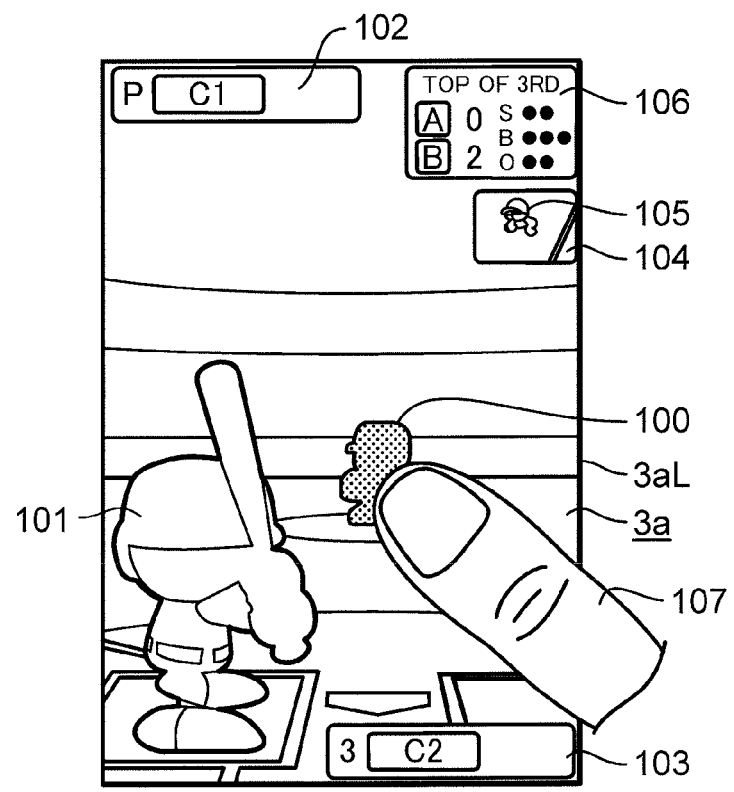
Figure 5A:
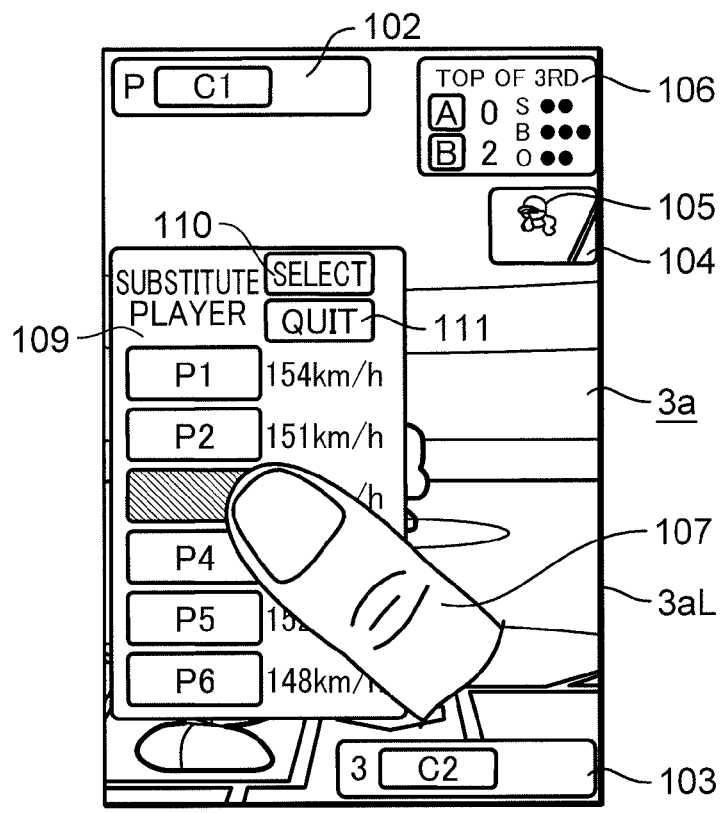
FIGS. 5A and 5B are diagrams showing a flow of a game screen continuing from FIG. 4.
Figure 5B:
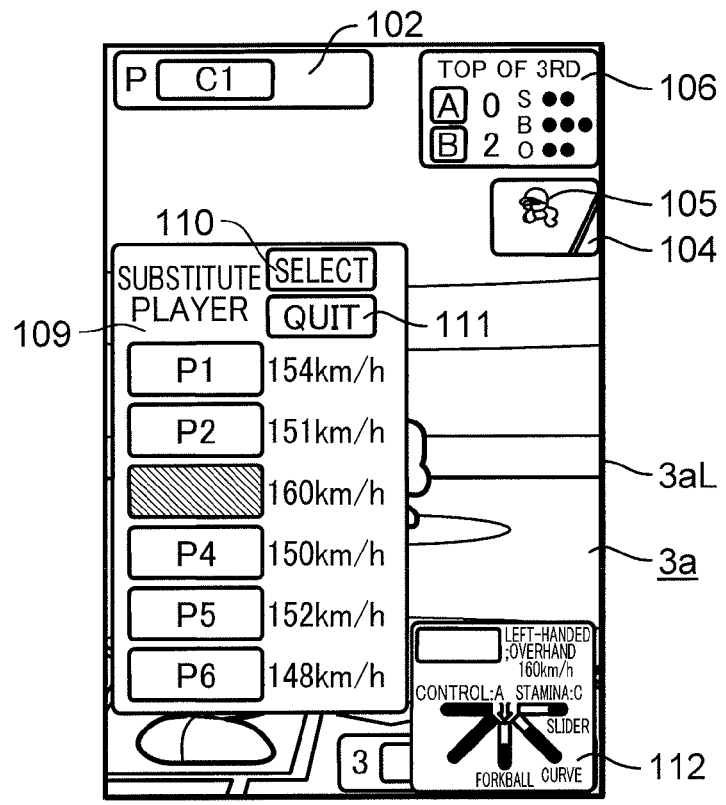
Figure 6A:
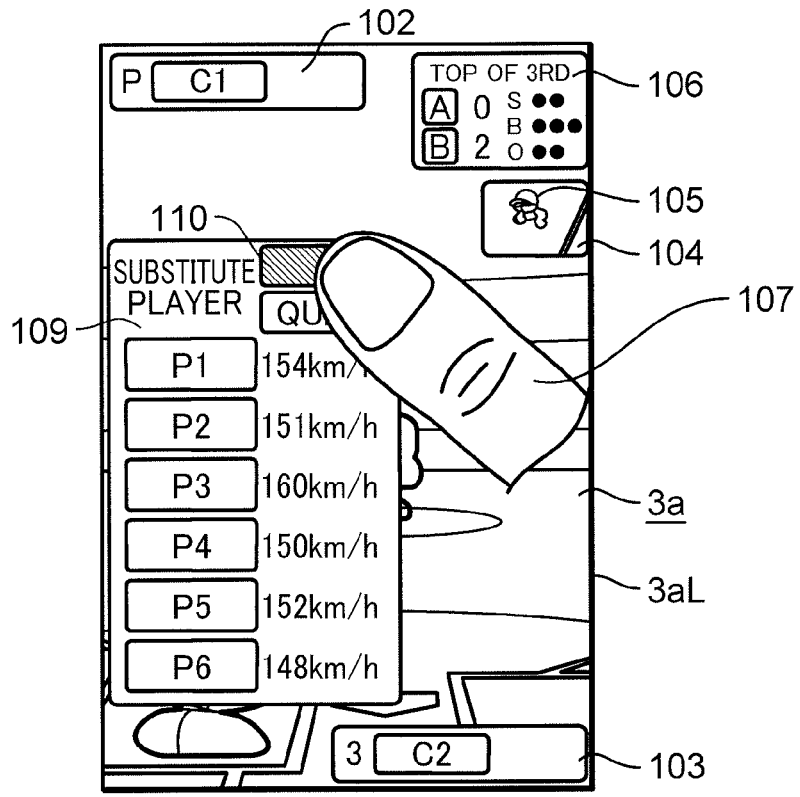
FIGS. 6A and 6B are diagrams showing a flow of a game screen continuing from FIG. 5.
Figure 6B:
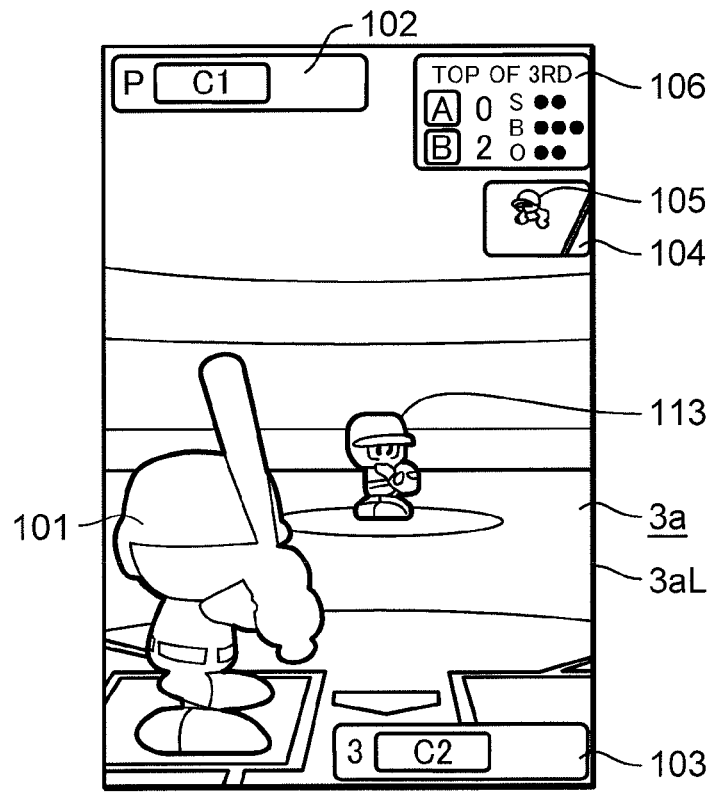
Figure 7:
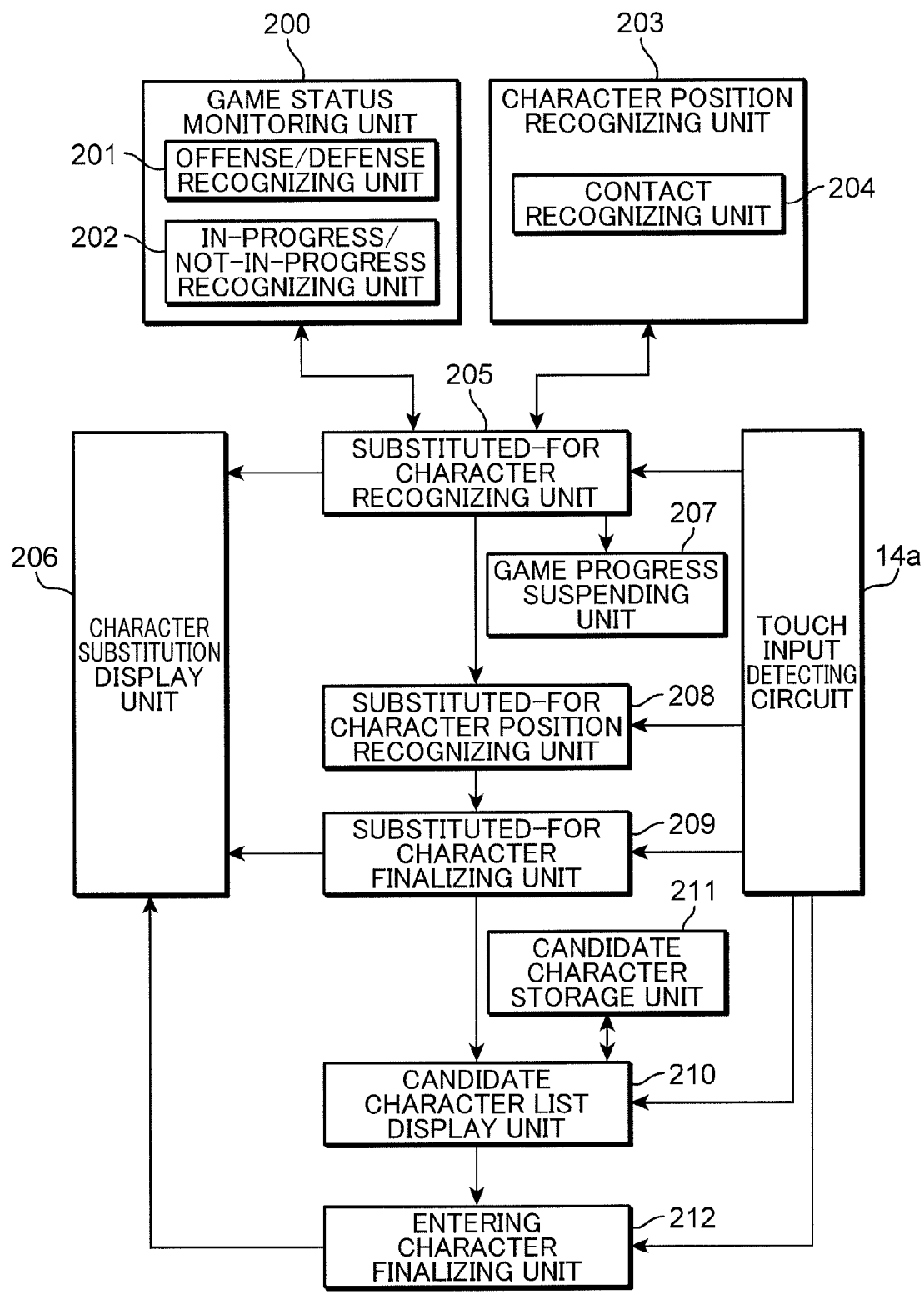
FIG. 7 is a functional block diagram showing main components of a game according to an embodiment of the present invention.

FIGS. 3A and 3B are diagrams which show examples of a game screen that is displayed on a monitor of, for example, a smartphone for describing a display state according to an embodiment when the present invention is applied to an operation for substituting player characters in a baseball game. FIGS. 4A to 6A and FIGS. 4B to 6B are, respectively, diagrams for describing display states that continue from FIG. 3. FIG. 7 is a functional block diagram which describes functions that perform important roles in the present invention and which correspond to a part of the control device 10 shown in FIG. 2. Hereinafter, a description will be given with reference to FIGS. 3 to 7. A case will now be described in which the game player is on defense and a pitcher on the mound is to be substituted.

FIG. 3A shows a state of a pitcher character 100 prior to starting his windup against a batter character 101. Reference characters 102 and 103 respectively indicate fields that display names of the pitcher character and the batter character. In this case, the name of the pitcher is shown as C1 and the name of the batter as C2. The number at a left end of the field 103 indicates a uniform number of the batter character C2. In addition, FIG. 3A also shows a runner window 104 that is displayed when there is a runner on base. In this case, it is shown that a runner 105 is at first base. Although not displayed in this diagram, when there is a second base runner and a third base runner, additional runner windows are to be independently displayed at center and at a left end of an upper part of the screen. In addition, a scoreboard 106 is displayed which shows a score situation of a game, a count, and the like.

In this state, when the game player wishes to substitute the pitcher character 100 as judged from game status and the like, first, as shown in FIG. 3B, the game player brings a finger 107 into direct contact with the pitcher character 100 on the same screen for a predetermined period of time or more (for example, two seconds or more). As a result, in order to notify the game player that the finger has made contact, a color of the entire pitcher character 100 is displayed in a uniform single color (for example, blue). Any form of expression may be adopted besides the above as long as a notification can be made to the game player. For example, an effect may be created in which a periphery of the pitcher character is illuminated. However, in a game situation where, for example, the pitcher has already started his windup, the batter is in a batting motion, or a runner is running by the time the game player makes contact with the finger 107, substitution is forbidden and the notification described above is not made. Moreover, it is needless to say that, since the game player is on defense, a substitution operation cannot be performed when coming into contact with a batter or the like on offense.

Figure 8:
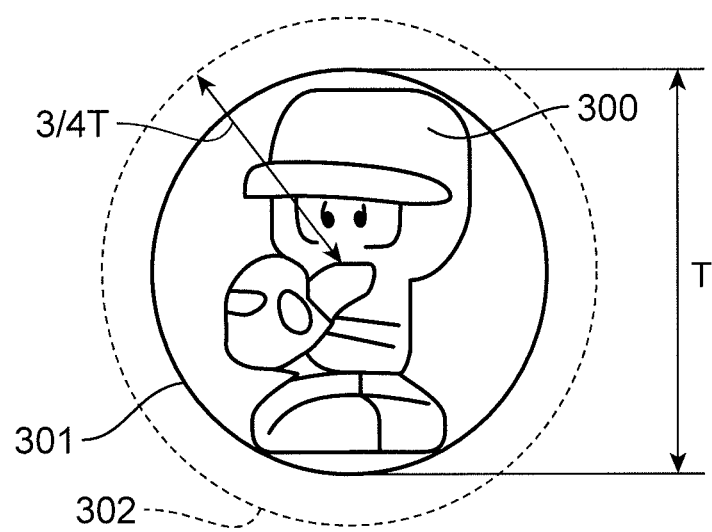
FIG. 8 is an explanatory diagram of a method of solving a possible problem according to an embodiment of the present invention.

When bringing a finger into contact with the pitcher character 100, a contact sensing region desirably includes leeway. This is because since the present embodiment is targeted at contact-type games of a smartphone or the like, directly pressing on a character when specifying the character results in obscuring the character or making the character less visible. In particular, as will be described later, when performing an operation of moving a character that is touched by a finger while maintaining the contact with the finger, it is difficult to tell if the character is reliably moving and the operation may arouse a sense of uneasiness. Therefore, as shown in FIG. 8, a contact sensing region of a character that is a contact object is desirably set larger than the character. Specifically, as shown in FIG. 8, a circle 301 that circumscribes a character 300 is set, a concentric circle 302 (contact sensing region) that is slightly larger than the circle 301 is further set, and a determination is made that a finger is in contact with the character if the finger comes into contact with the inside of the concentric circle 302 even if the finger is not touching the character itself. Moreover, while a circle is depicted for the sake of description in FIG. 8, in reality, a circle is not shown. If a character has a total length of T, a size of the concentric circle 302 is desirably around 1.1 to 1.5 T. This is because a larger size may result in overlapping a contact sensing region of another character.

According to this configuration, upon substituting a player character, since it is assumed that contact is made with the player character when contact is made with any part of a region surrounding the character even if the player character itself is not touched, a situation is avoided where the player character is hidden under a finger. In particular, in a case of substituting a player character that is shown in a relatively small size on the screen such as a runner, when pressing down on the character and then moving the character, there is a risk that one becomes unsure of whether or not the player character is following the movement under the finger. However, according to the present configuration, such situations can be avoided.

Figure 4A:
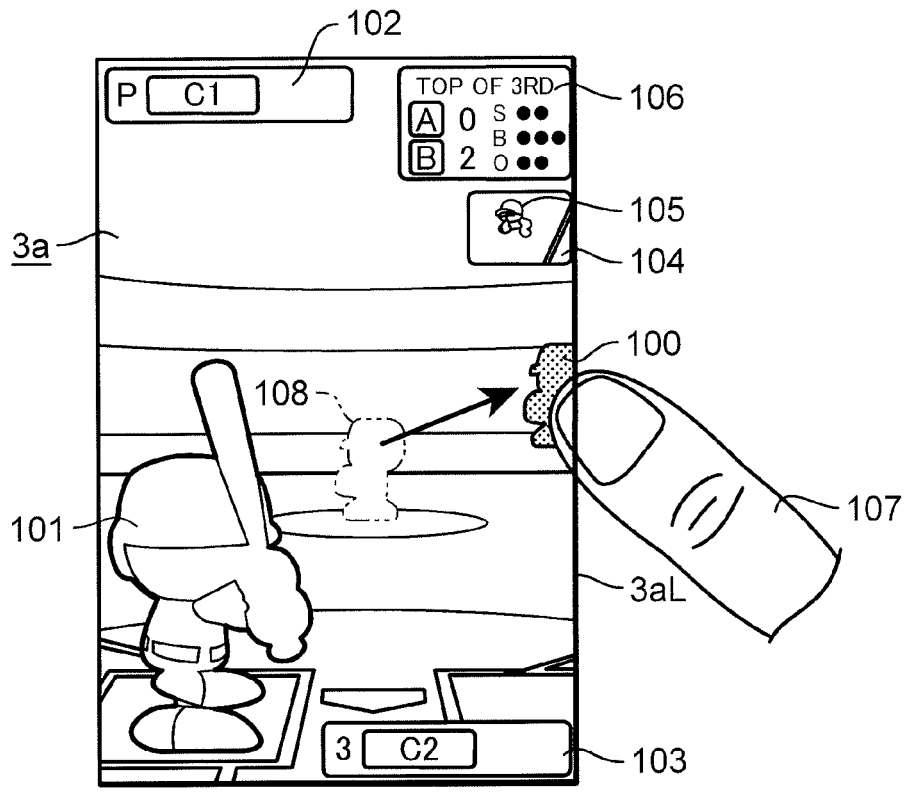
FIGS. 4A and 4B are diagrams showing a flow of a game screen continuing from FIG. 3.
Figure 4B:
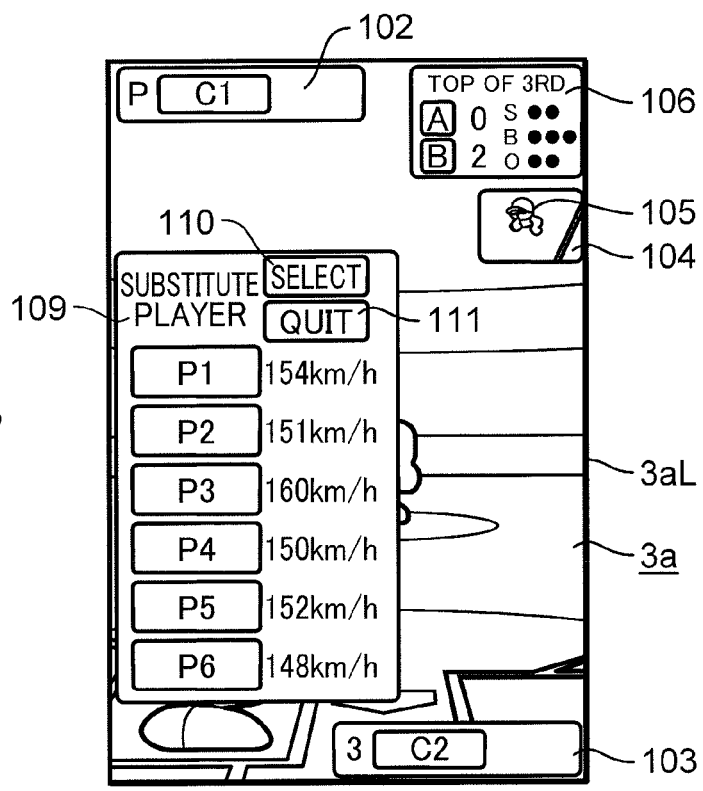

When the notification described above is made (when it is recognized that contact has been made with the pitcher character 100 for a predetermined period of time or more), the progress of the game is temporarily suspended. Note that, at this stage, the pitcher character 100 has merely been selected as a player who is a substitution object and has not been determined and, therefore, substitution has not been executed. Next, as shown in FIG. 4A, when the game player moves the pitcher character 100 while maintaining the contact between the finger 107 and the pitcher character 100, the pitcher character 100 moves simultaneously with the finger 107. An afterimage 108 of the pitcher character 100 is displayed at a position of the pitcher character 100 prior to movement. While the afterimage 108 is displayed in this example in a form that only retains an outline of the pitcher character 100, any form may be adopted as long as a difference from the pitcher character 100 about to be moved can be clearly indicated. For example, the afterimage 108 may be displayed in a paler color. Subsequently, once the pitcher character 100 is moved to an edge 3aL (a substituted-for character determination region) of the monitor 3a while keeping the finger 107 in contact with the monitor 3a, the pitcher character 100 is determined to be a substitution object. In this case, the edge 3aL is not limited to a right edge as shown in the drawing and may instead be any one of four edges of the monitor 3a. Moreover, to define a movement of the pitcher character 100 to the edge 3aL, it is determined that the pitcher character 100 has reached the edge 3aL once ½ or more of a width of the pitcher character 100 in a horizontal direction has disappeared from the screen. Subsequently, although not shown in the drawings, the pitcher character 100 is erased from the screen and a display of FIG. 4B is performed. Moreover, if the finger 107 of the game player is released before the pitcher character 100 reaches the edge 3aL of the monitor 3a, it is assumed that an operation for substitution has not taken place and the afterimage 108 is erased and, at the same time, the pitcher character 100 is returned to its position prior to movement.

According to the method described above, once the game player brings a finger into contact with a player character that the game player wishes to substitute, the player character need only be moved to the outside of the screen (outside of the monitor unit 3) instead of having to move the player character to a particular location. Therefore, operations are significantly simplified. For example, if the game device is a smartphone, the game player should feel that, once a finger is brought into contact with a player character, all that is left to do is to run the finger to the outside of the smartphone. Therefore, superior operability is achieved. Moreover, while operability may slightly decline, the substituted-for character determination region may be set on the scoreboard inside the game screen or may be set in a frame provided at a predetermined location on the screen. In essence, any location may suffice as long as the location is clearly separated from a current position of the player character that the game player wishes to substitute on the game screen. However, in such a case, the substituted-for character determination region is desirably outlined or colored so as to be readily distinguishable from other locations so that the game player can clearly understand how far a player character must be moved to become a substitute object.

As described above, by moving a player character to be substituted for to another location, the player character can be determined to be a substitution object. Therefore, the game player can perform operations with almost a sense of discarding an unnecessary object. Moreover, in order to make the fact that the player character has been determined to be a substitution object clearly understandable to the game player, an effect may be added such as changing a color, a size, or a form of the player character or illuminating the player character or its periphery once the character reaches the substituted-for character determination region.

In addition, since the afterimage 108 is displayed at the position of the player character prior to movement, the game player can clearly recognize which player character is selected as a substituted-for character. At the same time, since a new character is displayed so as to replace the afterimage 108 once a new entering character to replace the substituted-for character is determined, the game player can readily visually recognize the substitution of one player with another.

To describe the above flow with reference to a functional block diagram shown in FIG. 7, first, according to the configuration of the present embodiment, a game status of the game is being monitored by a game status monitoring unit 200. The game status monitoring unit 200 includes an offense/defense recognizing unit 201 which recognizes whether the game player is on offense or defense and an in-progress/not-in-progress recognizing unit 202 which recognizes whether the current game status is "in progress" or "not in progress". In this case, the term "in progress" means that a player character participating in the game is engaged in an action related to winning or losing the game, regardless of whether that player character is on the game player's team or the opposing team. In the case of a baseball game, examples of such actions include a pitcher character having started his windup, a batter in a batting motion, a runner running between bases, and a fielder in a fielding motion. Although a description will be provided later, whether or not a substitution of a player character is allowed is determined based on recognition statuses of the offense/defense recognizing unit 201 and the in-progress/not-in-progress recognizing unit 202.

Specifically, due to game status recognition by the offense/defense recognizing unit 201, even when a game player on offense (defense) comes into contact with a player character on defense (offense) that is the opposing team either inadvertently or by an incorrect operation, the player character is not recognized as a substituted-for character and is not moved. Therefore, progress of the game can be appropriately managed. In addition, due to recognition of the game status by the in-progress/not-in-progress recognizing unit 202, operations related to the substitution of player characters cannot be performed when the game is in progress. Accordingly, unfair acts such as abruptly substituting a player character in order to avoid losing a game or to circumvent an adverse situation can be prevented from being committed in advance. Furthermore, even when a finger is brought into contact with a player character in order to substitute the player character, since a movement of the player character itself is disabled, a timing at which a player substitution can be made may be indirectly notified to a game player.

In addition, positions of all player characters are recognized by a character position recognizing unit 203. The character position recognizing unit 203 includes a contact recognizing unit 204. Since leeway has been provided for contact with a character as described earlier with reference to FIG. 8, the contact recognizing unit 204 performs processing by assuming that contact has been made with the character when contact is made with a vicinity of a periphery of the character even if the character itself is not touched. In a state where the function described above is provided, when the game player brings a finger into contact with the monitor 3a, first, a recognition is made regarding whether or not a coordinate of a contact position of the finger 107 recognized by the touch input detecting circuit 14a is consistent with a positional coordinate of a character and, if so, which character. This determination or recognition is made by a substituted-for character recognizing unit 205 by referring to data of the character position recognizing unit 203.

In the case of the example described above, when the substituted-for character recognizing unit 205 recognizes that the finger 107 of the game player has come into contact with the pitcher character 100, based on the recognition information, a character substitution display unit 206 displays the pitcher character 100 by uniformly coloring the pitcher character 100 in a single color. Moreover, assuming that an incorrect operation may be performed by a game player or contact may be unintentionally made with a character, the substituted-for character recognizing unit 205 only recognizes that a character is a substitution object when contact continues for a predetermined period of time or more (for example, two seconds or more). In addition, when such recognition is made, an instruction is issued to a game progress suspending unit 207 to suspend the current game progress. Next, while the pitcher character 100 moves with a movement of the finger of the game player, a position of the pitcher character due to the movement is recognized by a substituted-for character position recognizing unit 208 based on information from the touch input detecting circuit 14a.

Once the pitcher character 100 is moved to the edge 3aL of the monitor 3a while maintaining a state where the finger 107 of the game player is in contact with the screen of the monitor 3a, a substituted-for character determination unit 209 determines substitution of the pitcher character 100. On the other hand, when the finger 107 of the game player separates during the movement of the pitcher character 100 to the edge 3aL, first, the fact that a separation has occurred is detected by the touch input detecting circuit 14a. Subsequently, since the substituted-for character position recognizing unit 208 detects that the pitcher character 100 has not yet reached the edge 3aL of the monitor 3a that is the substituted-for character determination region, the substituted-for character determination unit 209 determines that the series of operations for substitution is invalid. The character substitution display unit 206 then erases the afterimage 108 and, at the same time, returns the pitcher character 100 to its original position.

Meanwhile, in the configuration described above, the pitcher character 100 that is an object is determined to be a substituted-for character when the game player brings a finger into contact with the pitcher character 100 and, while maintaining that state, moves the pitcher character 100 to a predetermined location or, more specifically, the edge 3aL of the monitor 3a. However, the following configuration may be adopted as an alternative. Specifically, determination is made by moving the pitcher character 100 at a predetermined speed or higher. In other words, after touching a player character that is an object, when the game player performs an operation as though flicking away the player character in any direction, the player character is determined to be a substituted-for character. In this configuration, regardless of a movement location, a movement direction, and a movement distance of the player character, the player character is determined to be a substituted-for character when it is detected that the player character has been touched and subsequently moved at a predetermined speed or higher. According to this configuration, determination of a substituted-for character can be performed more easily and intuitively. For example, the predetermined speed or higher can be set to 50 (cm/s) or higher.

Returning now to FIG. 4A, when the pitcher character 100 is moved to the edge 3aL of the monitor 3a by the finger 107 of the game player, as shown in FIG. 4B, the pitcher character 100 is erased and a substitute player list (candidate character list) 109 for pitcher substitution is displayed. Reference numeral 110 denotes a select button for determining a selected player and 111 denotes a quit button for aborting an operation for player substitution. Names of six backup pitchers P1 to P6 are displayed on the substitute player list 109, and a maximum pitch velocity of each player is displayed to the right of each name. Next, as shown in FIG. 5A, as the game player brings the finger 107 into contact with, for example, a player name display field of player P3, as shown in FIG. 5B, an ability display field 112 showing detailed information on a pitching ability of the player P3 is displayed in a bottom right part of the monitor 3a. For example, the variety of pitches, control, stamina, earned run average (ERA), and the like of the pitcher are displayed in the ability display field 112. After confirming the detailed information, if the game player wishes to view another candidate, by touching the name of another player on the substitute player list 109, detailed information on the other player newly displayed in the ability display field 112 can be confirmed. Once a backup player to be selected is decided, as shown in FIG. 6A, the game player determines the entering pitcher character by bringing the finger 107 into contact with the select button 110, and as shown in FIG. 6B, a new pitcher character (a pitcher character 113) is displayed in place of the afterimage 108 on the monitor 3a. In FIG. 6B, the pitcher character has changed to a left-handed pitcher from a right-handed pitcher prior to substitution. In addition, the name in the name field 102 in FIG. 6B has changed from C1 to C3. Moreover, in order to clearly convey to the game player that the pitcher has been substituted, an effect is desirably displayed in which the name of the pitcher lights up or blinks for a predetermined amount of time.

To describe the flow above with reference to the functional block diagram in FIG. 7, once the pitcher character 100 is moved to the edge 3aL of the monitor 3a, the pitcher character 100 is determined to be a substitution object by the substituted-for character determination unit 209. A candidate character list display unit 210 then calls up data of a player character that is a substitution object from a candidate character storage unit 211 and displays the substitute player list (the candidate character list) 109 on the monitor 3a as shown in FIG. 4B. Subsequently, as the game player touches a name of a player character among the substitute player list 109, the candidate character list display unit 210 further calls data of a relevant player character from the candidate character storage unit 211 and displays the data on the monitor 3a. Subsequently, as the game player touches the select button 110, an entering character determination unit 212 determines the player character to be the substituted-for player character. Once the substituted-for player character is determined, the character substitution display unit 206 erases the afterimage 108 displayed on the monitor 3a, displays a new player character, and changes the name displayed in the name field 102 from C1 prior to substitution to C3 that is the name of the new player character.

As described above, in the present embodiment, since a game player can complete a substitution of a player character on a same screen without having to make a transition from a game screen to another screen, superior operability is provided and game flow is not impeded. Furthermore, since a finger is brought into direct contact with a player character that the game player wishes to substitute, a designation can be made intuitively. In addition, since substitution of a player character can be readily made by moving the player character with the finger to a predetermined location (for example, outside of the screen) almost as though discarding the player, a fun sensation can be provided at the same time.

Moreover, while an exemplary case of substituting the pitcher character 100 has been described in the embodiment above, a substitution operation can be performed in a similar manner with other characters. For example, if the game player is on offense, a batter character may be substituted by a pinch hitter or a runner on base may be substituted by a pinch runner. In the case of a pinch runner, for example, by bringing a finger into contact with a runner 105 in a runner window 104 shown in FIG. 3 and moving the runner 105 to an edge of the monitor 3a, a list of pinch runner candidates can be displayed in a similar manner.

Figure 9:
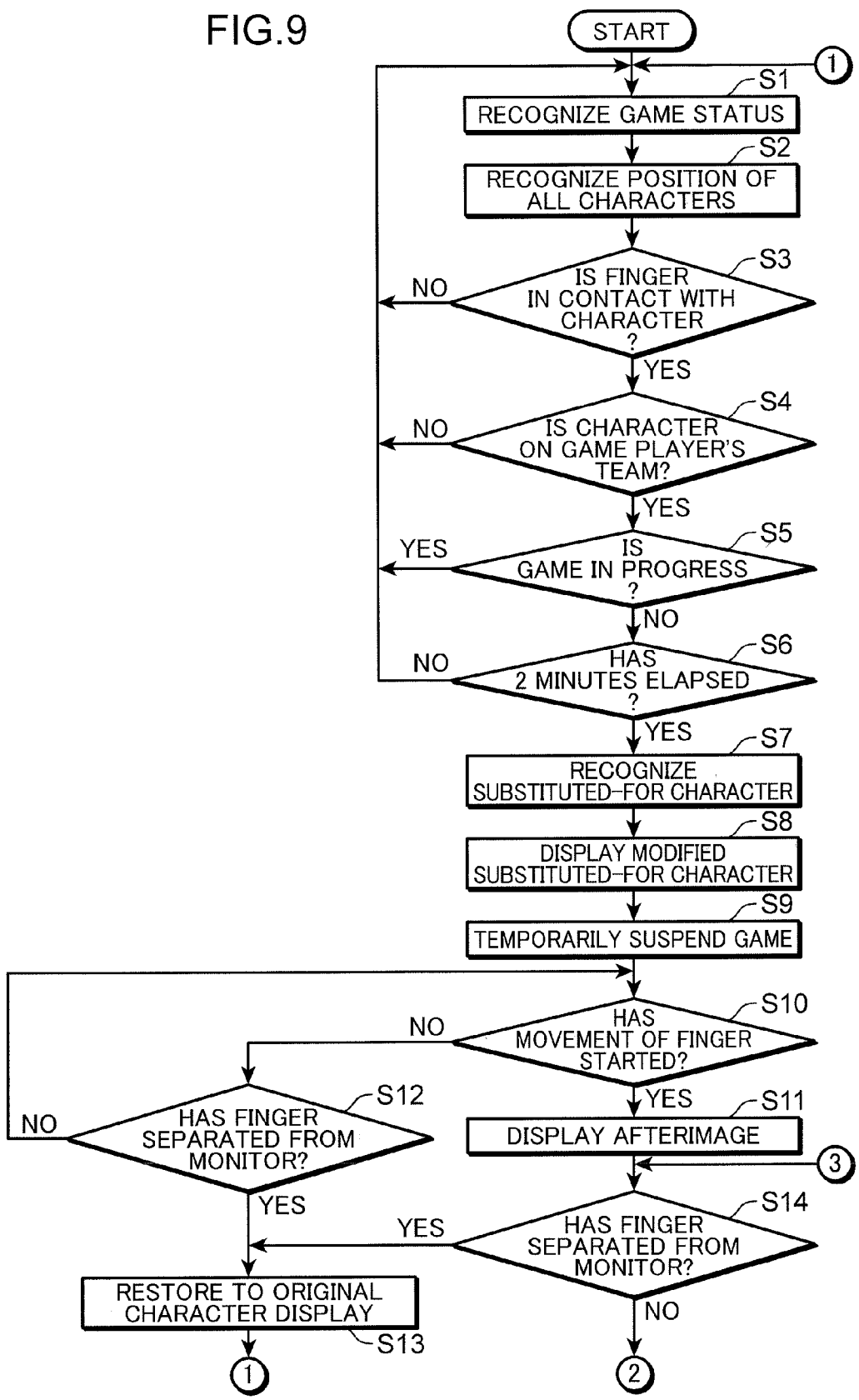
FIG. 9 is a flow chart of a game according to an embodiment of the present invention.
Figure 10:
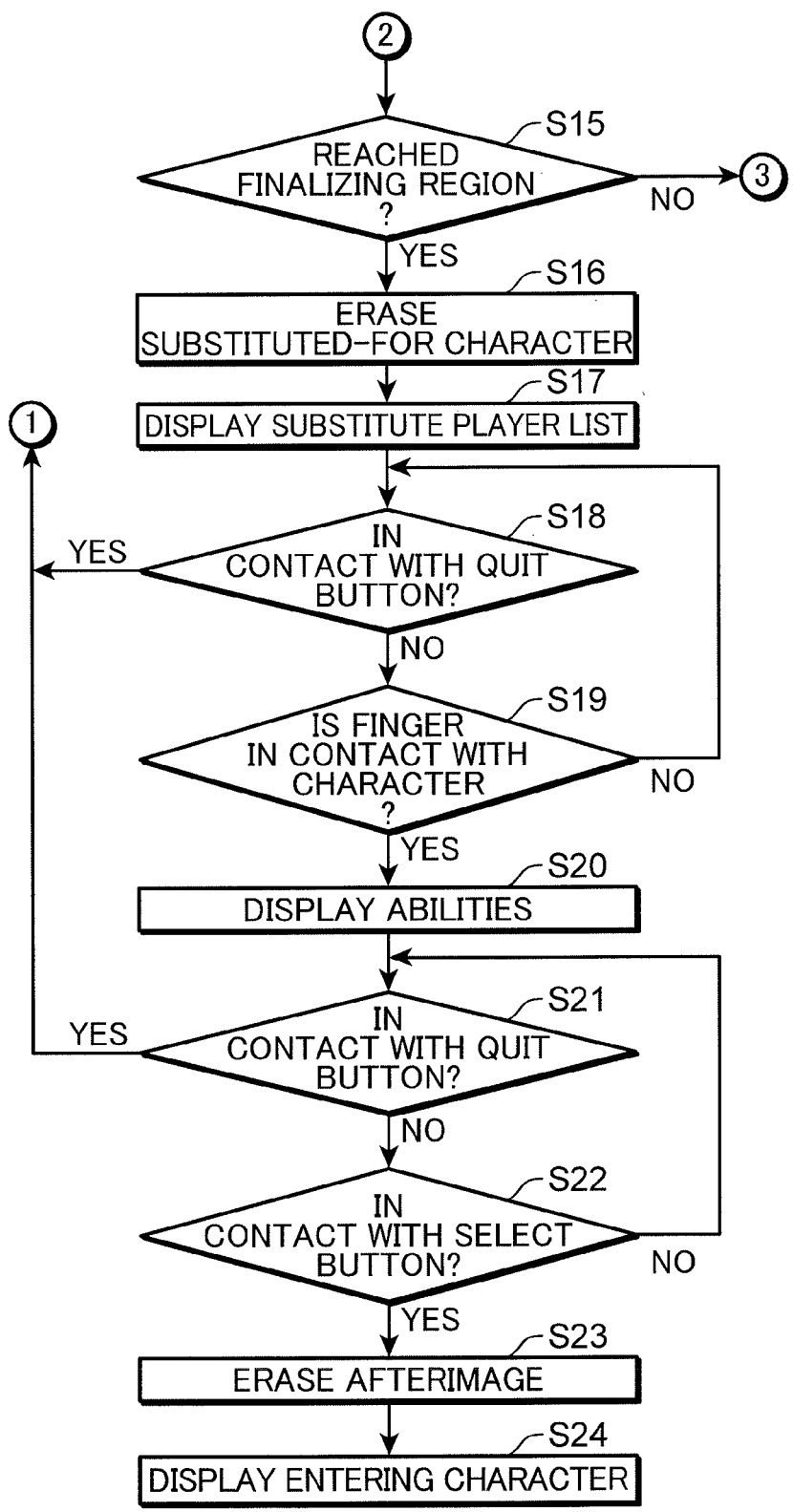
FIG. 10 is a flow chart continuing from FIG. 9.

FIGS. 9 and 10 are flow charts showing processing for substituting a player character in a baseball game on a game device according to an embodiment of the present invention. While steps of the substitution processing will be hereinafter described, the game screens shown in FIGS. 3 to 6 and the functional block diagram shown in FIG. 7 will also be referred to as appropriate. Moreover, steps S1 to S14 will be described with reference to FIG. 9, and step S15 and subsequent steps will be described with reference to FIG. 10.

First, the game status monitoring unit 200 recognizes a current game status of a baseball game or, in other words, a status including whether the game player is on offense or defense and whether or not the game is in progress (step S1). In addition, the character position recognizing unit 203 recognizes positions of all player characters participating in the game (step S2). Next, the touch input detecting circuit 14a determines whether or not a finger of the game player has been brought into contact with a player character on the monitor 3a (step S3). If the finger has not been brought into contact (NO in step S3), processing returns to step S1, and if the finger has been brought into contact (YES in step S3), processing proceeds to step S4. In other words, based on information of the offense/defense recognizing unit 201 comprising the game status monitoring unit 200, a determination is made regarding whether or not the player character touched by the finger belongs to the game player's team (step S4). If the player character does not belong to the game player's team (NO in step S4), processing returns to step S1, and if the player character belongs to the game player's team (YES in step S4), processing proceeds to step S5.

Specifically, a determination is made regarding whether or not the game is in progress (in the middle of a windup, a batting motion, a running motion, or the like) based on information of the in-progress/not-in-progress recognizing unit 202 comprising the game status monitoring unit 200 (step S5). If the game is in progress (YES in step S5), processing returns to step S1, and if the game is not in progress (NO in step S5), processing proceeds to step S6. Specifically, due to an internal function of the substituted-for character recognizing unit 205, a determination is made regarding whether or not the contact by the finger of the game player has continued for a predetermined amount of time or more (for example, 2 seconds or more) (step S6). If the contact has not continued for a predetermined amount of time or more (NO in step S6), processing returns to step S1, but if contact has continued for a predetermined amount of time or more (YES in step S6), the substituted-for character recognizing unit 205 recognizes that the player character touched by the game player is a substituted-for character (a character to be substituted for) (step S7). In other words, the player character 100 touched by the finger of the game player is recognized as a substituted-for character when satisfying the three conditions below.

1. The player character touched by the finger is a player character on the game player's team.
2. The contact by the finger does not occur when the game is in progress.
3. A duration of continuous contact by the finger is equal to or longer than a predetermined amount of time.

When the player character 100 touched by the game player is recognized as a substituted-for character (hereinafter, referred to as a substituted-for character 100), in order to notify the game player of the recognition, the character substitution display unit 206 modifies display of the substituted-for character 100 by modifying color or the like (step S8) and the game progress suspending unit 207 temporarily suspends the game (step S9). Subsequently, the substituted-for character position recognizing unit 208 determines whether or not a movement of the substituted-for character 100 accompanying a movement of the finger of the game player has started (step S10). When a movement is performed (YES in step S10), the afterimage 108 is displayed at an original position of the substituted-for character 100 (step S11), and when a movement is not performed (NO in step S10), a determination is made regarding whether or not the finger of the game player has separated from the monitor 3a (step S12). When the finger of the game player has separated from the monitor 3a prior to movement (YES in step S12), the display of the substituted-for character 100 regarding color modification or the like is restored to its original state (step S13) and processing returns to step S1. On the other hand, when the finger has not separated from the monitor 3a (NO in step S12), processing returns to step S10 and stands by until a movement of the finger is started. When the finger separates after the movement of the substituted-for character 100 (the movement of the finger of the game player) has started (YES in step S14), processing proceeds to step S13.

Hereinafter, step S15 and subsequent steps will be described with reference to FIG. 10. When the finger is moving without separating from the monitor 3a (NO in step S14), a determination is made regarding whether or not the substituted-for character 100 has reached the edge 3aL of the monitor 3a that is a substituted-for character determination region (step S15). When the substituted-for character 100 has not reached the edge 3aL (NO in step S15), processing returns to step S14. On the other hand, when the substituted-for character 100 has reached the edge 3aL (YES in step S15), the substituted-for character 100 is erased (step S16) and the substitute player list (the candidate character list) 109 is displayed on the monitor 3a (step S17). At this point, if the finger of the game player is brought into contact with the quit button 111 (YES in step S18), processing returns to step S1. On the other hand, when the quit button 111 is not pressed (NO in step S18), a determination is made regarding whether or not the finger of the game player has been brought into contact with the display field of any of the character names on the substitute player list 109 (step S19). If the finger has not been brought into contact with the display field of a character name (NO in step S19), processing returns to step S18. On the other hand, if the finger has been brought into contact with the display field of a character name (YES in step S19), detailed information (ability and the like) of the character touched on the monitor 3a is displayed in the ability display field 112 (step S20).

At this point, if the finger of the game player has been brought into contact with the quit button 111 (YES in step S21), processing returns to step S1. On the other hand, if the finger of the game player has not been brought into contact with the quit button 111 (NO in step S21), a determination is made regarding whether or not the finger of the game player has been brought into contact with the select button 110 (step S22). If finger of the game player has not been brought into contact with the select button 110 (NO in step S22), processing proceeds to step S21. On the other hand, when the finger of the game player has been brought into contact with the select button 110 (YES in step S22), the displayed afterimage 108 is erased (step S23) and a new entering character 113 is displayed at that position (step S24).

Moreover, while a baseball game has been described as an example in the present embodiment, the present invention can also be applied to other games as long as they are competition games in which player substitution is performed. For example, the present invention is applicable to games such as soccer, volleyball, and basketball.

Technical features of the game device described above may be summarized as follows.

(1) The game device described above is a game device which conducts a competition game in a virtual space by bringing indicating means into contact with a contact input-type image display unit, the game device comprising: a substituted-for character recognizing unit which recognizes a character to become a substitution object by bringing the indicating means into contact with a single character participating in the competition game; a substituted-for character determination unit which determines the character to be a substituted-for character by causing the character recognized by the substituted-for character recognizing unit to be moved to a substituted-for character determination region while maintaining the contact between the indicating means and the character; a candidate character list display unit which displays a list of candidate characters who enter the game in place of the substituted-for character on the image display unit based on the determination of the substituted-for character by the substituted-for character determination unit; an entering character determination unit which determines a character who enters the game in place of the substituted-for character by bringing the indicating means into contact with a single character on the candidate list; and a character substitution display unit which displays the entering character determined by the entering character determination unit in place of the substituted-for character on the image display unit.

According to this configuration, when a game player wishes to substitute a character participating in a competition game with another character, by directly bringing a finger (indicating means) into contact with a character in a screen and moving the character to another location (a substituted-for character determination region) while maintaining the state of contact, the character can be determined to be a substitution object (the substitution has not been completed at this point). In this case, for example, the other location (the substituted-for character determination region) may be set at the edge of the game screen or on the scoreboard or set in a frame provided at a predetermined location on the game screen. In other words, the other location (the substituted-for character determination region) may be any location as long as the location is clearly separated from a current position of the character on the game screen. However, the other location is desirably a location that can be distinguished from other locations by being outlined or colored or a location such as the outside of the screen which can be readily recognized either visually or tactually so as to enable the game player to clearly understand how far the character must be moved to become a substitution object. As described above, by performing an operation to move a character to another location, the character can be recognized as a substitution object. Therefore, the game player can determine the substituted-for player character with almost a sense of discarding an unnecessary object. Moreover, while the fact that the moved player character has been determined to be a substituted-for player character can be determined based on the movement of the character to the predetermined location, in order to make the determination even more clearly understandable to the game player, an effect may be added such as changing a color, a size, or a form of the moved character or illuminating the character or its periphery.

In addition, when the player character to be substituted for is determined to be described above, a list of candidate characters to be entered in place of the substituted-for character is displayed on the same screen. For example, a list of player characters that are pinch hitters is displayed when a batter is to be substituted for and a list of backup pitcher characters is displayed when a pitcher is to be substituted for. At this point, when the game player brings a finger into contact with one of the candidates on the candidate list described above, an entering player character is selected and player substitution is completed.

As described above, in the present configuration, since a game player can complete a substitution of a player character on a same screen without having to make a transition from a game screen to another screen, superior operability is provided and game flow is not impeded. Furthermore, since a finger is brought into direct contact with a player character that the game player wishes to substitute, a designation can be made intuitively. In addition, since substitution of a player character can be readily made by moving the player character to a predetermined location almost as though discarding the player character, a fun sensation can be provided at the same time.

(2) Preferably, the substituted-for character determination region is an outer frame section of a game screen displayed on the image display unit.

According to this configuration, once the game player brings a finger into direct contact with a player character that the game player wishes to substitute, the player character need only be moved to the outside of the screen (outside of the monitor unit) instead of having to move the player character to a particular location. Therefore, operations are significantly simplified. For example, if the game device is a smartphone, the game player should feel that, once a finger is brought into contact with a player character, all that is left to do is to run the finger to the outside of the smartphone. Therefore, superior operability is achieved.

(3) Preferably, when a character to become a substitution object is recognized by the substituted-for character recognizing unit and is moved, the character substitution display unit displays an afterimage of the character at a position prior to movement, and when an entering character is determined by the entering character determination unit, the character substitution display unit erases the afterimage and displays the entering character at that position.

According to this configuration, since an afterimage of a character is left behind at a location after movement of the character, a game player can clearly recognize which player character is selected as a substituted-for character. In addition, when an entering character is determined, a new character is displayed so as to replace the afterimage. Therefore, the game player can clearly recognize, through a substitution operation, which player character has been substituted.

(4) Preferably, when a character is engaged in an action related to winning or losing the game, the substituted-for character recognizing unit prohibits the character from being recognized as a substituted-for character.

According to this configuration, unfair acts such as abruptly substituting a player character in order to avoid losing a game or to circumvent an adverse situation regarding a team or a player character can be prevented from being committed in advance. Furthermore, even when a finger is brought into contact with a player character in order to substitute the player character, since a movement of the character itself is disabled, a timing at which a player substitution can be made may be indirectly notified to a game player.

(5) Preferably, the competition game is a game in which two teams that are respectively made up of a plurality of players take turns on offense and defense, and the substituted-for character recognizing unit sets only characters on the offensive team so as to be recognizable during offense and sets only characters on the defensive team so as to be recognizable during defense.

According to this configuration, even if the offense (defense) touches a character on defense (offense) either inadvertently or by an incorrect operation, the character is neither recognized as a substituted-for character nor moved. Therefore, progress of the game can be appropriately managed.

(6) Preferably, a hidden contact recognizing region is provided at an outer periphery of the character, and a contact recognizing unit is further provided which recognizes that the indicating means has been brought into contact with the character based on a contact made by the indicating means with the contact recognizing region.

According to this configuration, upon substituting a player character, since it is assumed that contact is made with the player character itself when contact is made with any part of a region surrounding the character even if the player character itself is not touched, a situation is avoided where the player character is hidden under a finger. In particular, in a case of substituting a player character that is shown in a relatively small size on the screen such as a runner, when pressing down on the character and then moving the character, there is a risk that one becomes unsure of whether or not the player character is following the movement under the finger. However, according to the present configuration, such situations can be avoided.

(7) Preferably, the contact recognizing region is circular and has a diameter that is approximately 1.1 to 1.5 times a total length of the character.

Providing the contact recognizing region with an excessively large size creates a risk of the contact recognizing region overlapping a contact recognizing region of another player character. A simulation carried out by the present applicant revealed that, preferably, the contact recognizing region is circular and has a diameter that is approximately 1.1 to 1.5 times the total length of the character.

(8) The game device described above may be a game device which conducts a competition game in a virtual space by bringing indicating means into contact with a contact input-type image display unit, and the game device may comprise: a substituted-for character recognizing unit which recognizes a character to become a substitution object by bringing the indicating means into contact with a single character participating in the competition game; a substituted-for character determination unit which determines the character to be a substituted-for character by causing the character recognized by the substituted-for character recognizing unit to be moved toward an outer frame section of a game screen displayed on the image display unit at a predetermined or higher speed from a state where the indicating means is in contact with the character; a candidate character list display unit which displays a list of candidate characters who enter the game in place of the substituted-for character on the image display unit based on the determination of the substituted-for character by the substituted-for character determination unit; an entering character determination unit which determines a character who enters the game in place of the substituted-for character by bringing the indicating means into contact with a single character on the candidate list; and a character substitution display unit which displays on the image display unit the entering character determined by the entering character determination unit in place of the substituted-for character.

While the present configuration is basically similar to configuration (1), the present configuration differs from configuration (1) in an operation for determining a substituted-for character. Specifically, while a substituted-for character is determined in configuration (1) by a game player bringing a finger into contact with a character that is an object and moving the character to a predetermined location (a substituted-for character determination region) while maintaining the state of contact, a substituted-for character is determined in the present configuration by moving a character that is an object toward an outer frame section of the game screen at a predetermined speed or higher instead of moving the character to the substituted-for character determination region. In other words, when the game player performs an operation that is almost as though flicking away an object player character, the player character is determined to be a substituted-for character. In addition, in the present configuration, regardless of a movement direction, a movement location, and a movement distance of a player character, the player character is determined to be a substituted-for character when it is detected that the player character has been touched and subsequently moved at a predetermined speed or higher. According to this configuration, determination of a substituted-for character can be performed more easily and intuitively than in configuration (1).

This Non-provisional application claims priority under 35 U.S.C. 119 (a) on Patent Application No. 2010-275824 filed in Japan on Dec. 10, 2010, the entire contents of which are hereby incorporated by reference.

INDUSTRIAL APPLICABILITY

The present invention can be utilized in a game in which an instruction is issued by bringing indicating means into contact with a contact input-type image display unit.

The invention claimed is:

1. A game device which conducts a competition game in a virtual space by bringing indicating means into contact with a contact input-type image display unit, the game device comprising:
 a touch input detection circuit which detects contact of the indicating means with the image display unit;
 a substituted-for character recognizing unit which recognizes a single character among a plurality of characters participating in the competition dame and displayed on the image display unit as a substitution object, when the touch input detection circuit detects contact of the indicating means with the single character;

a substituted-for character determination unit which determines the character recognized by the substituted-for character recognizing unit to be a substituted-for character, when the touch input detection circuit detects a movement of the character recognized by the substituted-for character recognizing unit to a substituted-for character determination region displayed on the image display unit while maintaining the contact between the indicating means and the character recognized by the substituted-for character recognizing unit;

a candidate character storage unit which stores data of candidate characters who enter the game in place of the substituted-for character in advance;

a candidate character list display unit which (i) generates a list of candidate characters who enter the game in place of the substituted-for character based on the data of candidate characters stored in the candidate character storage unit, and (ii) displays the candidate list on the image display unit, when the substituted-for character determination unit determines the substituted-for character;

an entering character determination unit which determines a single character on the candidate list as an entering character who enters the game in place of the substituted-for character, when the touch input detection circuit detects the contact of the indicating means with the single character on the candidate list; and a character substitution display unit which displays, on the image display unit, the entering character determined by the entering character determination unit in place of the substituted-for character, wherein when the character is recognized as the substitution object by the substituted-for character recognizing unit and is moved to the substituted-for character determination region displayed on the image display unit, the character substitution display unit displays an afterimage of the character recognized as the substitution object at a position prior to the movement, and when the entering character is determined by the entering character determination unit, the character substitution display unit erases the afterimage of the character and displays the entering character at the position prior to the movement.

2. The game device according to claim 1, wherein the substituted-for character determination region is an outer frame section of a game screen displayed on the image display unit.

3. The game device according to claim 1, wherein when a character is engaged in an action related to winning or losing the game, the substituted-for character recognizing unit prohibits the character from being recognized as a substitution object.

4. The game device according to claim 1, wherein
the competition game is a game in which two teams that are respectively made up of a plurality of players take turns on offense and defense, and
the substituted-for character recognizing unit sets only characters on the offensive team so as to be recognizable during offense and sets only characters on the defensive team so as to be recognizable during defense.

5. The game device according to claim 1, wherein the touch input detection circuit detects the contact of the indicating means with the single character based on contact made by the indicating means with a hidden contact recognizing region provided at an outer periphery of the single character.

6. The game device according to claim 5, wherein the hidden contact recognizing region is circular and has a diameter that is approximately 1.1 to 1.5 times a total length of the single character.

7. A non-transitory computer-readable recording medium which stores a game control program which causes a computer to execute a competition game in a virtual space by bringing indicating means into contact with a contact input-type image display unit, the computer including a touch input detection circuit which detects contact of the indicating means with the image display unit, the game control program causing the computer to function as:

a substituted-for character recognizing unit which recognizes a single character among a plurality of characters participating in the competition dame and displayed on the image display unit as a substitution object, when the touch input detection circuit detects contact of the indicating means with the single character;

a substituted-for character determination unit which determines the character recognized by the substituted-for character recognizing unit to be a substituted-for character, when the touch input detection circuit detects a movement of the character recognized by the substituted-for character recognizing unit to a substituted-for character determination region displayed on the image display unit while maintaining the contact between the indicating means and the character recognized by the substituted-for character recognizing unit;

a candidate character storage unit which stores data of candidate characters who enter the game in place of the substituted-for character in advance;

a candidate character list display unit which (i) generates a list of candidate characters who enter the game in place of the substituted-for character based on the data of candidate characters stored in the candidate character storage unit, and (ii) displays the candidate list on the image display unit, when the substituted-for character determination unit determines the substituted-for character;

an entering character determination unit which determines a single character on the candidate list as an entering character who enters the game in place of the substituted-for character, when the touch input detection circuit detects the contact of the indicating means with the single character on the candidate list; and a character substitution display unit which displays, on the image display unit, the entering character determined by the entering character determination unit in place of the substituted-for character, wherein when the character is recognized as the substitution object by the substituted-for character recognizing unit and is moved to the substituted-for character determination region displayed on the image display unit, the character substitution display unit displays an afterimage of the character recognized as the substitution object at a position prior to the movement, and when the entering character is determined by the entering character determination unit, the character substitution display unit erases the afterimage of the character and displays the entering character at the position prior to the movement.

8. A game device which conducts a competition game in a virtual space by bringing indicating means into contact with a contact input-type image display unit, the game device comprising:

a touch input detection circuit which detects contact of the indicating means with the image display unit;

a substituted-for character recognizing unit which recognizes a single character among a plurality of characters participating in the competition dame and displayed on the image display unit as a substitution object, when the touch input detection circuit detects contact of the indicating means with the single character;

a substituted-for character determination unit which determines the character recognized by the substituted-for character recognizing unit to be a substituted-for character, when the touch input detection circuit detects a movement of the character recognized by the substituted-for character recognizing unit toward an outer frame section of a game screen displayed on the image display unit at a predetermined or higher speed which regulates an operation of flickering away the character from a state where the indicating means is in contact with the character recognized by the substituted-for character recognizing unit;

a candidate character storage unit which stores data of candidate characters who enter the game in place of the substituted-for character in advance;

a candidate character list display unit which (i) generates a list of candidate characters who enter the game in place of the substituted-for character based on the data of candidate characters stored in the candidate character storage unit, and (ii) displays the candidate list on the image display unit, when the substituted-for character determination unit determines the substituted-for character;

an entering character determination unit which determines a single character on the candidate list as an entering character who enters the game in place of the substituted-for character, when the touch input detection circuit detects the contact of the indicating means with the single character on the candidate list; and a character substitution display unit which displays, on the image display unit, the entering character determined by the entering character determination unit in place of the substituted-for character.

9. A non-transitory computer-readable recording medium which stores a game control program which causes a computer to execute a competition game in a virtual space by bringing indicating means into contact with a contact input-type image display unit, the computer including a touch input detection circuit which detects contact of the indicating means with the image display unit, the game control program causing the computer to function as:

a substituted-for character recognizing unit which recognizes a single character among a plurality of characters participating in the competition game and displayed on the image display unit as a substitution object, when the touch input detection circuit detects contact of the indicating means with the single character;

a substituted-for character determination unit which determines the character recognized by the substituted-for character recognizing unit to be a substituted-for character, when the touch input detection circuit detects a movement of the character recognized by the substituted-for character recognizing unit toward an outer frame section of a game screen displayed on the image display unit at a predetermined or higher speed which regulates an operation of flickering away the character from a state where the indicating means is in contact with the character recognized by the substituted-for character recognizing unit;

a candidate character storage unit which stores data of candidate characters who enter the game in place of the substituted-for character in advance;

a candidate character list display unit which (i) generates a list of candidate characters who enter the game in place of the substituted-for character based on the data of candidate characters stored in the candidate character storage unit, and (ii) displays the candidate list on the image display unit, when the substituted-for character determined unit determines the substituted-for character;

an entering character determination unit which determines a single character on the candidate list as an entering character who enters the game in place of the substituted-for character, when the touch input detection circuit detects the contact of by bringing the indicating means with the single character on the candidate list; and a character substitution display unit which displays, on the image display unit, the entering character determined by the entering character determination unit in place of the substituted-for character.

* * * * *